United States Patent
Narayanaswamy

(10) Patent No.: US 6,295,457 B1
(45) Date of Patent: *Sep. 25, 2001

(54) INTEGRATED CELLULAR TELEPHONE BASESTATION WITH INTERNET GATEWAY

(75) Inventor: Shankar Narayanaswamy, Santa Clara, CA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,436

(22) Filed: Jun. 27, 1997

(51) Int. Cl.[7] .................................. H04Q 7/20
(52) U.S. Cl. .................. 455/466; 455/445; 370/230; 370/231
(58) Field of Search ................... 455/403, 424, 455/425, 445, 449, 466, 500, 524, 550, 552, 556, 561, 435, 432, 428; 370/229, 230, 235, 401, 338, 346, 347, 350, 442, 332, 349, 521

(56) References Cited

U.S. PATENT DOCUMENTS

| | | | | |
|---|---|---|---|---|
| 4,661,659 | * | 4/1987 | Nishimura | 455/462 |
| 5,341,410 | * | 8/1994 | Aron et al. | 455/410 |
| 5,379,448 | * | 1/1995 | Ames et al. | 455/524 |
| 5,404,392 | * | 4/1995 | Miller et al. | 455/466 |
| 5,457,680 | * | 10/1995 | Kamm et al. | 370/332 |
| 5,528,664 | * | 6/1996 | Slekys et al. | 455/452 |
| 5,555,241 | * | 9/1996 | Lazaridis et al. | 370/389 |
| 5,559,800 | * | 9/1996 | Mousseau et al. | 370/401 |
| 5,590,133 | * | 12/1996 | Billstrom et al. | 455/433 |
| 5,699,357 | * | 12/1997 | Carvey | 370/347 |
| 5,701,302 | * | 12/1997 | Geiger | 370/521 |
| 5,742,668 | * | 4/1998 | Pepe et al. | 455/415 |
| 5,758,293 | * | 5/1998 | Frasier | 455/556 |
| 5,781,857 | * | 7/1998 | Hwang et al. | 455/412 |
| 5,802,465 | * | 9/1998 | Hamalainen et al. | 455/403 |
| 5,845,211 | * | 12/1998 | Roach, Jr. | 455/436 |
| 6,006,189 | * | 12/1999 | Strawczynski et al. | 704/270 |
| 6,085,101 | * | 7/2000 | Jain et al. | 455/500 |

* cited by examiner

*Primary Examiner*—Nay Maung
*Assistant Examiner*—Jean A Gelin

(57) ABSTRACT

A system for directly connecting a mobile communication system to a data network is provided. A user initiates data communication with the data network from a mobile communication system equipped with a computer, a modem and a mobile communication device. Data communication signals, which may be designated for routing to the data network, are transmitted from the mobile communication device to a hybrid base station having a standard base station, a control unit and a data network gateway, via a wireless telecommunication network. The signals are received by the hybrid base station and routed to the control unit which determines whether the received data communication signals are of the type designated for routing to the data network. If the data communication signals are of the type so designated, the control unit routes the signals to the data network gateway, which then connects the mobile communication system to the data network, enabling a direct data communication connection therebetween via the wireless data communication network. Otherwise, the data communication signals are routed to another destination, such as to another base station or to the PSTN.

3 Claims, 2 Drawing Sheets

INTEGRATED CELLULAR TELEPHONE BASESTATION WITH INTERNET GATEWAY

BACKGROUND OF THE INVENTION

1. Field of the Invention

The present invention relates to a wireless data communication system. More particularly, the present invention is directed to a system for connecting one or more mobile communication devices directly to a data network via a wireless telecommunication network.

2. Description of the Related Art

Developments in wireless communication technologies have made mobile communication devices, such as cellular telephones, relatively inexpensive and reliable. At the same time, portable computers, some small enough to fit in a user's pocket, have gained widespread use. As a result, wireless data communication through a wireless telecommunication network has become possible by providing a portable computer with a modem and connecting it to a mobile communication device. Thus, portable computers equipped for wireless data communication could be used to remotely connect a user to a data network, such as the Internet, from any location within the wireless telecommunication network coverage area.

Typically, wireless connection to a data network is accomplished as follows. When a data call is placed from a mobile communication system, which includes a portable computer, a modem and a mobile communication device, the mobile communication system connects to a base station through the wireless telecommunication network. The base station is typically a telecommunication system capable of routing a call made from a mobile communication device within a predetermined range to another mobile communication device also within range, to another base station for rerouting to a distant mobile communication device outside of the range, or to a standard telephone on a wire or "land" line that is part of the Public Switched Telephone Network ("PSTN"). The base station routes the data call received from the mobile communication device to a data network gateway through the PSTN. The data network gateway is commonly a hybrid computer and telecommunication system that enables individual users to connect to a data network, such as the Internet, via a number of high speed digital data communication lines. Data network gateways are typically operated by data service providers, who for a periodic subscription fee grant to the users the right to access a data network through the data network gateway. Assuming that the user has access rights to use the particular data network gateway, the data call received from the base station is connected to the data network. For the duration of the connection of the data call the user may interact with the data network via the mobile communication system. For example, the user can send and receive electronic mail, and upload/download both text (ASCII) and/or binary data files to and from other computers connected to the data network.

The current data network access arrangement is flawed in a number of ways. First, as a mostly analog network, PSTN has limited bandwidth, and suffers from a relatively large amount of signal noise due to the constant transmission and presence of analog voice calls and the varied condition of the wring and switching equipment. Data calls transmitted through the PSTN frequently compete for bandwidth with each other and with analog voice calls. As a result, the PSTN acts as a bottleneck in that increased data communication traffic causes a proportional decrease in data communication speed. Furthermore, data calls are also affected by signal noise, often forcing the mobile communication systems to retransmit lost or corrupted data and resulting in a significant slowdown of data communication.

Second, the PSTN requires a dedicated channel (i.e., a standard voice telephone line) for each data connection. This channel consumes its full bandwidth even if no data is being transmitted, and as a result the PSTN bandwidth is wasted by inactive channels. Moreover, the bandwidth of each data connection is limited by the bandwidth of a voice telephone line.

Finally, as wireless communication technology moves toward a purely digital wireless communication standard, it becomes cumbersome and counterproductive to convert digital data communication from a mobile communication system to analog data for the sole purpose of transmission through the PSTN, and then have to convert the data back to digital form at the data network gateway.

It would thus be desirable to provide a system for connecting a mobile communication system to a data network directly, bypassing the PSTN.

SUMMARY OF THE INVENTION

The disadvantages and limitations discussed above are overcome by the present invention. The inventive wireless data communication system enables a user to directly connect to and to communicate with a data network, such as the Internet, bypassing the PSTN.

The wireless data communication system of the present invention includes a mobile communication system having a portable computer for initiating data communication and for interacting with other computers connected to a data network, a mobile communication device, such as a cellular telephone, for transmitting and receiving data communication signals to and from a wireless telecommunication network, and a modem for routing data communication signals between the portable computer and the mobile communication device. The system also includes a hybrid base station including a standard base station for transmitting and receiving data communication signals to and from a wireless telecommunication network, a data network gateway for establishing a data communication connection between the mobile communication system and the data network, and a control unit for selecting data communication signals that are of a type designated for the data network that are received by the base station and routing the selected data communication signals to the data network gateway. In another embodiment of the present invention, the data communication gateway is connected to and shared by one or more hybrid base stations with integrated control units.

The system of the present invention operates as follows. A user initiates data communication with the data network from the mobile communication system using the portable computer. Data communication signals, which may be designated for routing to the data network, are then transmitted from the portable computer to the mobile communication device through the modem. The mobile communication device then transmits the data communication signals to the hybrid base station via the wireless telecommunication network. The signals are received by the base station and routed to the control unit which determines whether the received data communication signals are of the type designated for routing to the data network. If the data communication signals are of the type so designated or identified, the control unit routes the signals to the data network gateway, which then connects the mobile communication system to the data network, enabling a bidirectional data communication connection therebetween via the wireless data communication network. Otherwise, the data communication signals are routed to another destination, such as to another base station or to a communication device connected to the PSTN.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
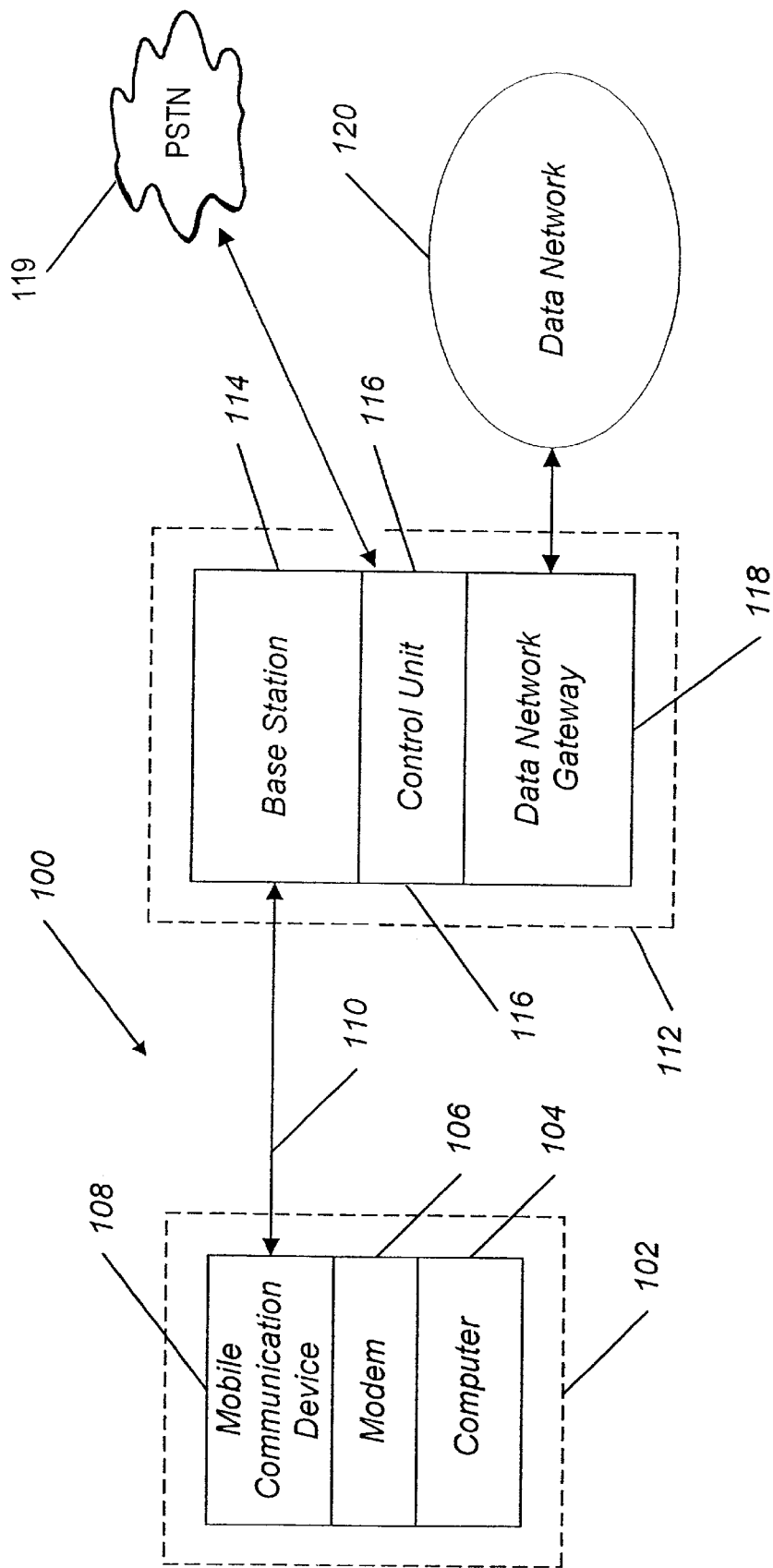
FIG. 1 is a schematic block diagram of a first embodiment of a system for directly connecting a mobile communication system to a data network in accordance with the present invention.

Before describing the system of the present invention in greater detail, it is pointed out that, in the drawings, specific communication circuitry for the base station and the data network gateway is not shown in detail as such circuitry is well-known and is commonly used in conjunction with base stations and data network gateways.

Referring now to the drawings, and initially to FIG. 1 thereof, a wireless data communication system 100 of the present invention is shown. The wireless data communication system 100 includes a mobile communication system 102 having a computer 104 for initiating data communication and for interacting with other computers connected to a data network 120, a mobile communication device 108, such as a cellular telephone, operable for transmitting and receiving data communication signals to and from a wireless telecommunication network 110, and a modem 106 operable for routing data communication signals between the computer 104 and the mobile communication device 108. The computer 104 may be any transportable computer such as a "notebook" computer or a hand-held pocket sized device or it may be a standard desktop or minicomputer. Alternately, the computer 104 may be an embedded device, such as a car's or a plane's onboard computer. The modem 106 is preferably a modem suitable for operation with mobile communication devices. The mobile communication device 108 may be a cellular telephone or another wireless communication device. The data network 120 may be any private data network or a public data network such as the Internet.

The components of the mobile communication system 102 may be separate interconnected devices. For example, a user may connect a modem 106 to the computer 104 and to the mobile communication device 108 before attempting to establish a data communication connection. As a matter of design choice, the functions of the modem 106 and the mobile communication device 108 may be integrated into a single unit. Alternatively, the mobile communication system 102 may be constructed as an integrated unit with the built-in functionality of the computer 104, the modem 106, and the mobile communication device 108. The data communication signals transmitted and received by the mobile communication device 108 are preferably in the digital format; however, the use of data signals in the analog format is also within the scope of the invention. Other peripheral devices such as a Global Positioning System ("GPS") (not shown) may also be connected to the computer 104.

The system 100 also includes a hybrid base station 112 having a standard base station 114 for transmitting and receiving data communication signals to and from a wireless telecommunication network 110, a data network gateway 118 for establishing a data communication connection between the mobile communication system 102 and the data network 120, and a control unit 116 for selecting data communication signals of a type designated for the data network 120 that are received by the base station 114 and routing the selected data communication signals to the data network gateway 11 8, and for selecting data communication signals of the type designated for the mobile communication system 102 received from the data network gateway 118, and routing the selected data communication signals to the base station 114 for transmission to the mobile communication system 102.

The standard base station 114 may be a typical wireless telecommunication base station well known in the art. The control system 116 may be any signal processing and switching system capable of being programmed to recognize and route data communication signals. The data network gateway 118 is a hybrid computer and telecommunication system that enables connection of individual computer systems to the data network 120 via a number of high speed digital data communication lines (not shown). If the mobile communication device 108 transmits and receives only analog data communication signals, the data network gateway 118 may include analog to digital and digital to analog converters (not shown).

While only a single mobile communication system 102 is shown as communicating with the hybrid base station 112, it will be understood that a greater number of mobile communication systems may be simultaneously connected to the hybrid base station 112, the number being limited only by the communication capacity of the hybrid base station 112 and bandwidth capacity of the wireless telecommunication network 110. Furthermore, it will also be understood that while the hybrid base station 112 is shown as a single unit, each of the components i.e., the base station 114, the control unit 116 and the data network gateway 118, may be separate but interconnected devices.

The system of the present invention operates as follows. A user initiates data communication with the data network 120 from the mobile communication system 102 using the computer 104. Alternately, data communication may be initiated by the computer 104 automatically, for example in response to program instructions, by another component of the mobile communication system 102, or by a peripheral connected to the computer 104, such as a GPS. Data communication signals, which may be designated for routing to the data network 120, are then transmitted from the computer 104 to the mobile communication device 108 through the modem 106 connected therebetween. For example, if the hybrid base station 112 is operated by a particular data network service provider, and the user of the mobile communication system 102 subscribes to that data network service provider, the service provider may issue to the user a password or an access code enabling the user or the computer 104 to denote data communication signals originating from the mobile communication system 102 as being of a type designated for connection to and communication with the data network 120. The access code can be embedded in the computer 104 or the mobile communication device 108 so that it may be transmitted automatically when data communication is initiated from the mobile communication system 102.

The mobile communication device 108 then transmits the data communication signals to the hybrid base station 112 via the wireless telecommunication network 110. The signals are received by the base station 114 and routed to the control unit 116 which determines whether the received data communication signals are of the type designated for routing to the data network 120. If the data communication signals are of the type so designated, the control unit 116 routes the signals to the data network gateway 118, which then connects the mobile communication system 102 to the data network 120, enabling a bidirectional wireless data communication connection between the mobile communication system 102 and other computer systems connected to the data network 120. Otherwise, the data communication signals are routed to another destination, such as to another base station or to the PSTN 119. Alternatively, the functions of the control unit 116 may be integrated into the data network gateway 118 in the form of program instructions.

Figure 2:
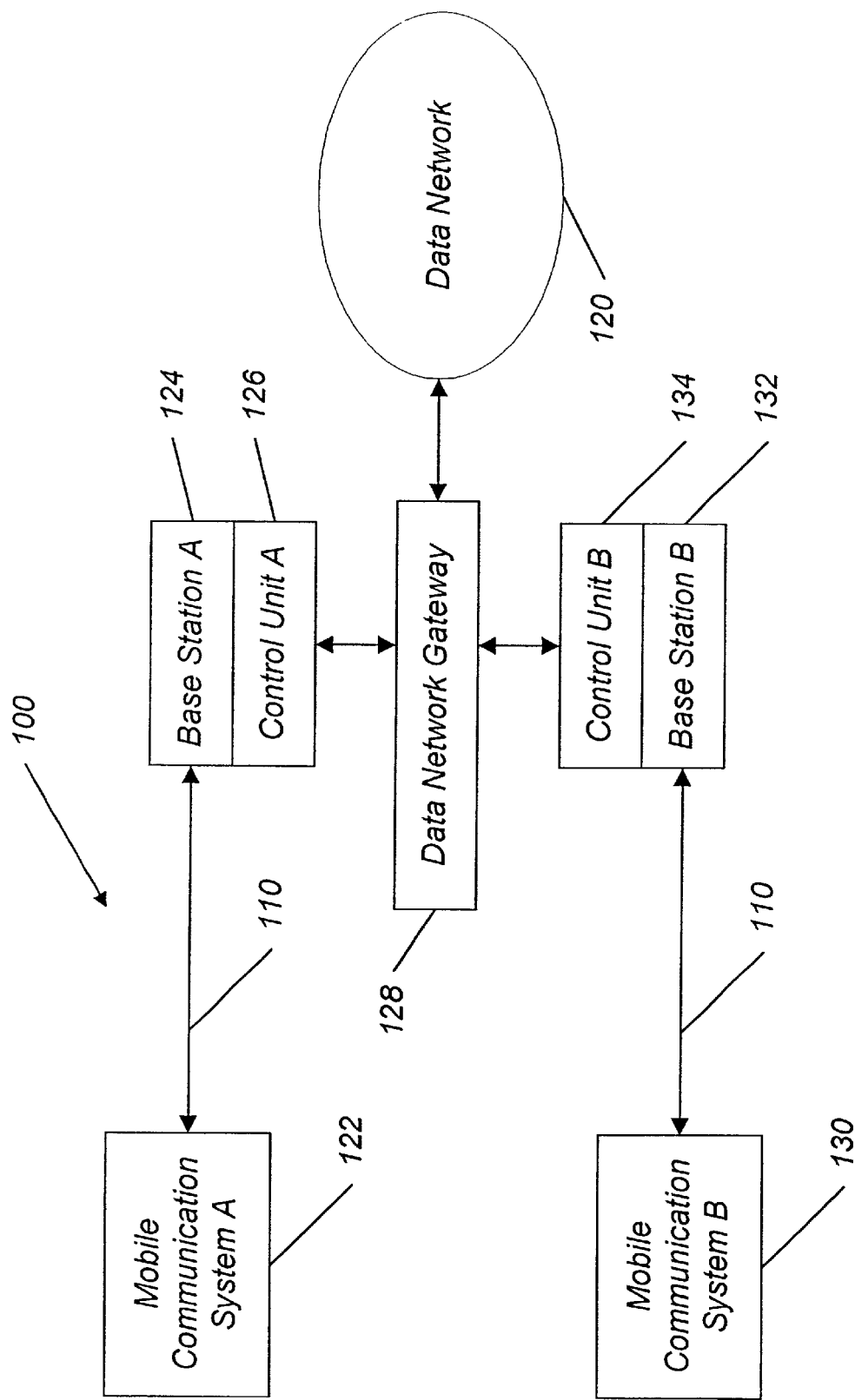
FIG. 2 is a schematic block diagram of a second embodiment of a system for directly connecting at least one mobile communication system to a data network in accordance with the present invention.

Referring to FIG. 2, another embodiment of the present invention is shown where the data communication gateway is connected to and shared by one or more base stations with integrated control units. Mobile communication systems A 122, and B 130, each of which is essentially equivalent to the mobile communication system 102, communicate via the wireless telecommunication network 110 with base stations A 124 and B 132, respectively. The base stations A 124 and B 132 are connected to respective control units A 126 and B 134. Both of the control units are connected to a single data network gateway 128 which, in turn, is connected to the data network 120. Thus, only a single data network gateway 128 need be used to connect one or more base stations to the data network 120. While only two base station/control unit assemblies are shown, it will be understood that a greater number of base station/control unit assemblies may alternately be connected to the data network gateway 128, the number being limited only by the capacity of the data network gateway 128.

In a modification of the above embodiments, data communication may be initiated from a remote computer connected to the data network 120. Data communication signals of a type designated for the mobile communication system 102 may be routed to the mobile communication system 102 via the wireless telecommunication network 110 by the data network gateway 118 and the control unit 116. For example, electronic mail may be sent from a remote computer connected to the data network 120 to the mobile communication system 102.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

I claim:

1. A wireless data communication system for bidirectionally communicating with a data network and a voice network via a wireless telecommunication network comprising:

a plurality of mobile communication systems operable for transmitting data communication signals at least a portion of which are designated for direct transmission to the data network, and for receiving data communication signals from the data network;

a plurality of base stations each operable for transmitting and receiving the data communication signals to and from at least one of the mobile communication systems via the wireless telecommunication network; and a data network gateway connected to said plurality of base stations and to the data network, and operable for connecting at least one of the plurality of mobile communication systems with the data network for data communication therebetween, via at least one of the plurality of base stations and the wireless telecommunication network, when the designated data communication signals are received;

wherein:

each of the plurality of mobile communication systems comprises a mobile communication device operable for communicating with the wireless telecommunication network, a computer for initiating the communication with the wireless telecommunication network through the mobile communication device, a modem for routing data communication signals between the computer and mobile communication device, and associated with each base station is a control unit for automatically selecting data communication signals that are of a type designated for the data network that are received by the base station and automatically routing the selected data communication signals to the data network gateway and for automatically routing other signals to the voice network.

2. The wireless data communication system according to claim 1, wherein:

the data network is the Internet.

3. The wireless data communication system according to claim 1, wherein;

the voice network is the public switched telephone network (PSTN).

* * * * *